United States Patent
Berggren

(10) Patent No.: US 8,801,340 B2
(45) Date of Patent: Aug. 12, 2014

(54) PIPE PART FOR CONVEYING A SOLID PARTICULATE MATERIAL

(75) Inventor: Wouter Detlof Berggren, Amsterdam (NL)

(73) Assignee: Shell Oil Company, Houston, TX (US)

( * ) Notice: Subject to any disclaimer, the term of this patent is extended or adjusted under 35 U.S.C. 154(b) by 480 days.

(21) Appl. No.: 11/793,082

(22) PCT Filed: Dec. 14, 2005

(86) PCT No.: PCT/EP2005/056765
§ 371 (c)(1),
(2), (4) Date: Oct. 1, 2007

(87) PCT Pub. No.: WO2006/064014
PCT Pub. Date: Jun. 22, 2006

(65) Prior Publication Data
US 2008/0031697 A1   Feb. 7, 2008

(30) Foreign Application Priority Data
Dec. 17, 2004  (EP) .................................. 04106660

(51) Int. Cl.
*B65G 53/52* (2006.01)
*B65G 53/58* (2006.01)

(52) U.S. Cl.
CPC ........ *B65G 53/52* (2013.01); *B65G 2812/1658* (2013.01); *B65G 53/521* (2013.01); *B65G 53/58* (2013.01)
USPC ........................................... 406/191; 406/89

(58) Field of Classification Search
CPC ...... B65G 53/52; B65G 53/521; B65G 53/18; B65G 2812/165; B65G 2812/1658
USPC .............................................. 406/86–91, 191
See application file for complete search history.

(56) References Cited

U.S. PATENT DOCUMENTS

| 1,622,768 A | 3/1927 | Cook et al. |
| 2,556,183 A | 6/1951 | Hapman |
| 3,040,760 A * | 6/1962 | Macks ............................ 137/13 |

(Continued)

FOREIGN PATENT DOCUMENTS

| DE | 1269571 | 5/1968 |
| JP | 61-151925 | 9/1986 |
| JP | 2004353852 A | 12/2004 |
| WO | WO 2004087331 | 10/2004 |

OTHER PUBLICATIONS

International Search Report dated Mar. 21, 2006.

*Primary Examiner* — William R Harp

(57) ABSTRACT

A pipe part (100) for conveying a solid particulate material, comprising an outer tubular element (1) stretching along a longitudinal axis (A) and having first (9) and second (12) sections axially displaced from each other. An inner tubular element (20) is disposable inside the outer tubular element (1) and adapted for longitudinally conveying the solid particulate material from one end to another end. The inner tubular element (20) comprises an aeration-fluid-permeable wall part (23), and is sealingly connected with—and flexibly supported by—the first and second sections (9,12) to form an aeration fluid distribution chamber (40) between the first and second sections (9,12) and the inner (20) and outer (1) tubular elements. The aeration fluid distribution chamber (40) is provided with an aeration fluid inlet (15) to define an aeration fluid flow path (19) between the aeration fluid inlet (15) through the aeration-fluid-permeable wall part (23) via the aeration fluid distribution chamber (40).

15 Claims, 4 Drawing Sheets

(56) References Cited

U.S. PATENT DOCUMENTS

| | | | |
|---|---|---|---|
| 3,260,285 A * | 7/1966 | Vogt | 141/8 |
| 3,409,274 A * | 11/1968 | Lawton | 366/144 |
| 3,604,758 A * | 9/1971 | Flain et al. | 406/50 |
| 4,207,007 A * | 6/1980 | Yamschikov et al. | 366/275 |
| 4,743,405 A * | 5/1988 | Durao et al. | 261/76 |
| 4,775,267 A * | 10/1988 | Yamamoto | 406/50 |
| 4,830,545 A * | 5/1989 | Salter et al. | 406/12 |
| 4,884,396 A | 12/1989 | Miyamoto et al. | 60/39.12 |
| 5,560,875 A | 10/1996 | Meshengisser et al. | |
| 5,562,366 A * | 10/1996 | Paulson | 406/12 |
| 5,722,802 A * | 3/1998 | March | 406/46 |
| 5,827,370 A | 10/1998 | Gu | 118/715 |
| 6,227,768 B1 | 5/2001 | Higuchi et al. | 406/89 |
| 6,354,465 B2 | 3/2002 | Bell et al. | |
| 6,719,500 B2 * | 4/2004 | Pfeiffer et al. | 406/91 |
| 6,722,822 B2 * | 4/2004 | Pfeiffer et al. | 406/164 |
| 6,764,253 B1 * | 7/2004 | Pfeiffer | 406/11 |
| 6,796,749 B2 * | 9/2004 | Pfeiffer et al. | 406/164 |
| 7,410,329 B2 * | 8/2008 | Simontacchi | 406/98 |

* cited by examiner

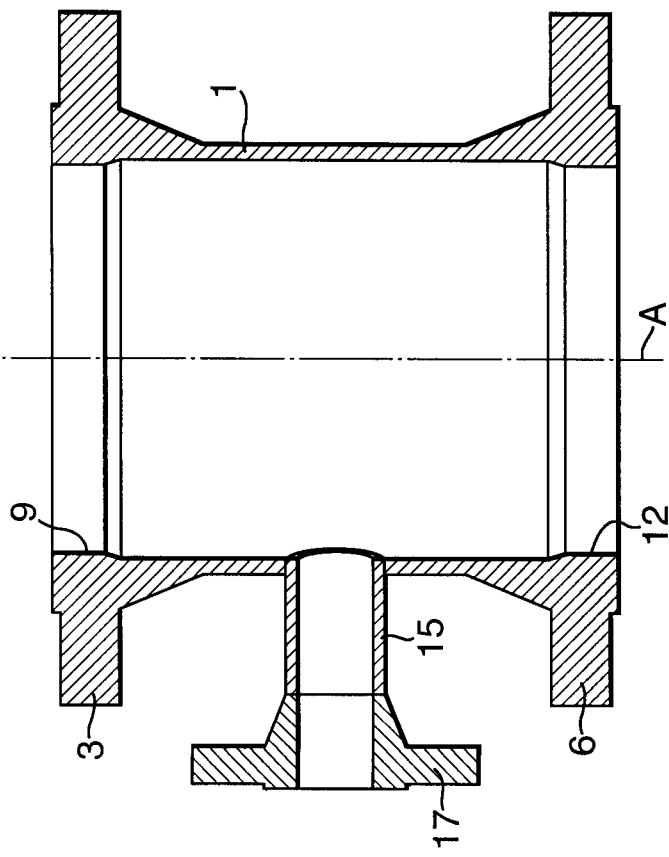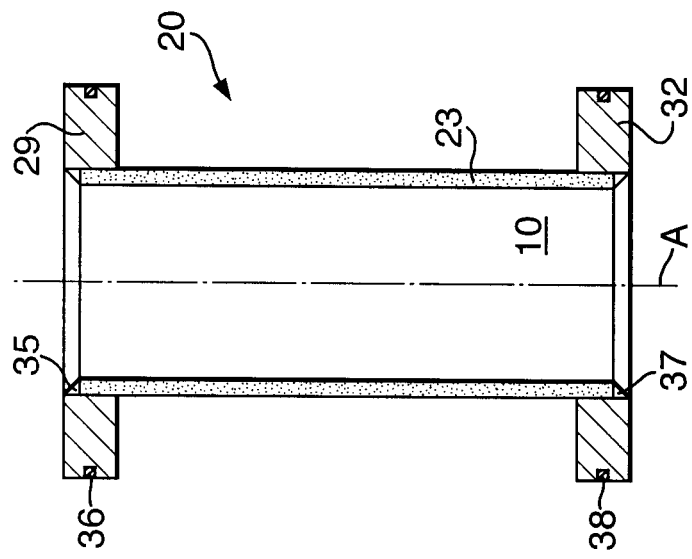

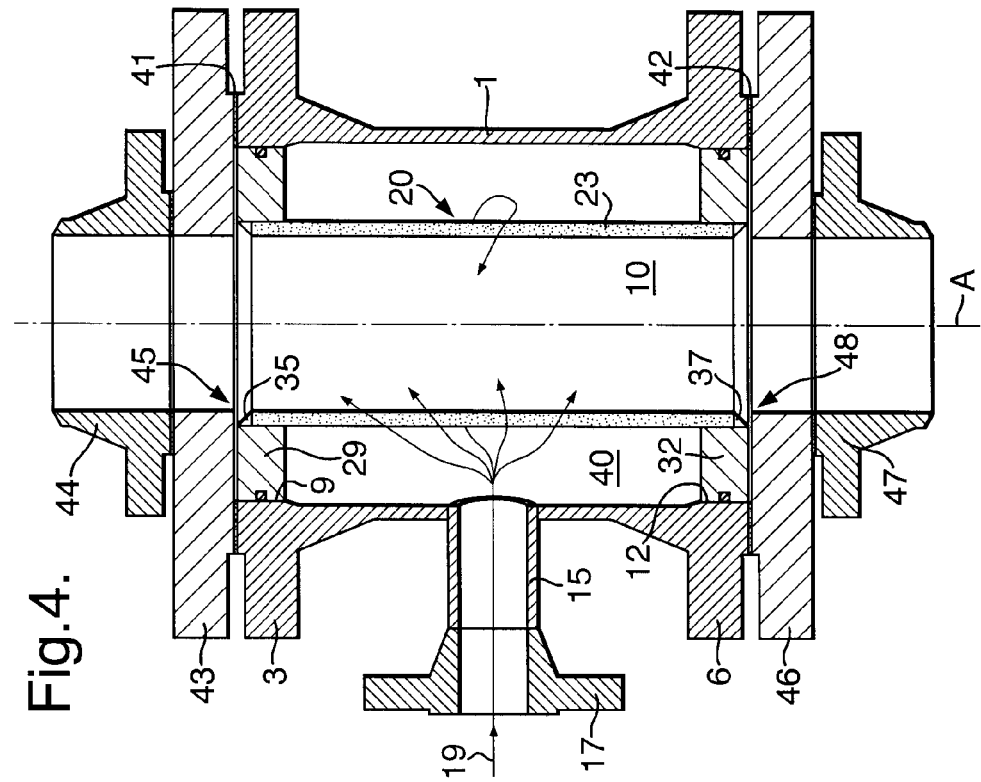
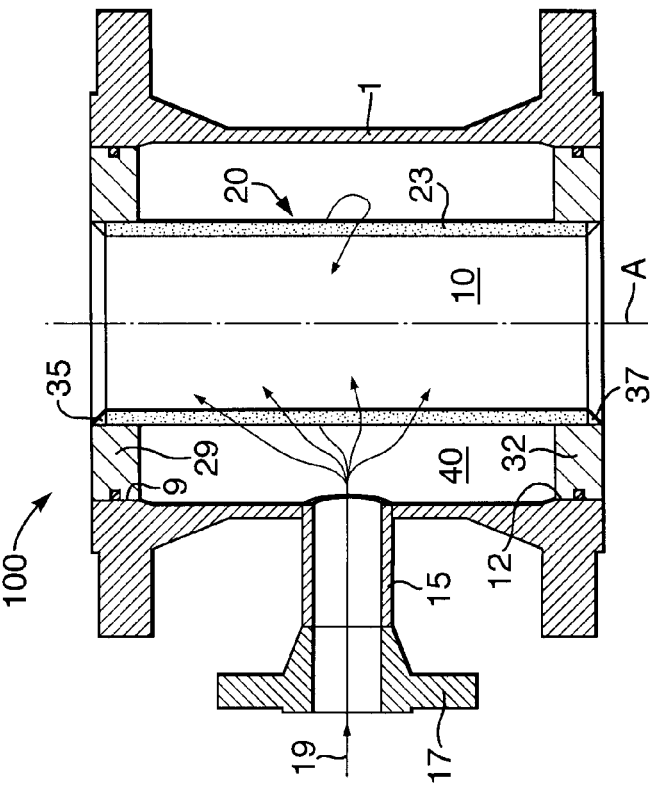

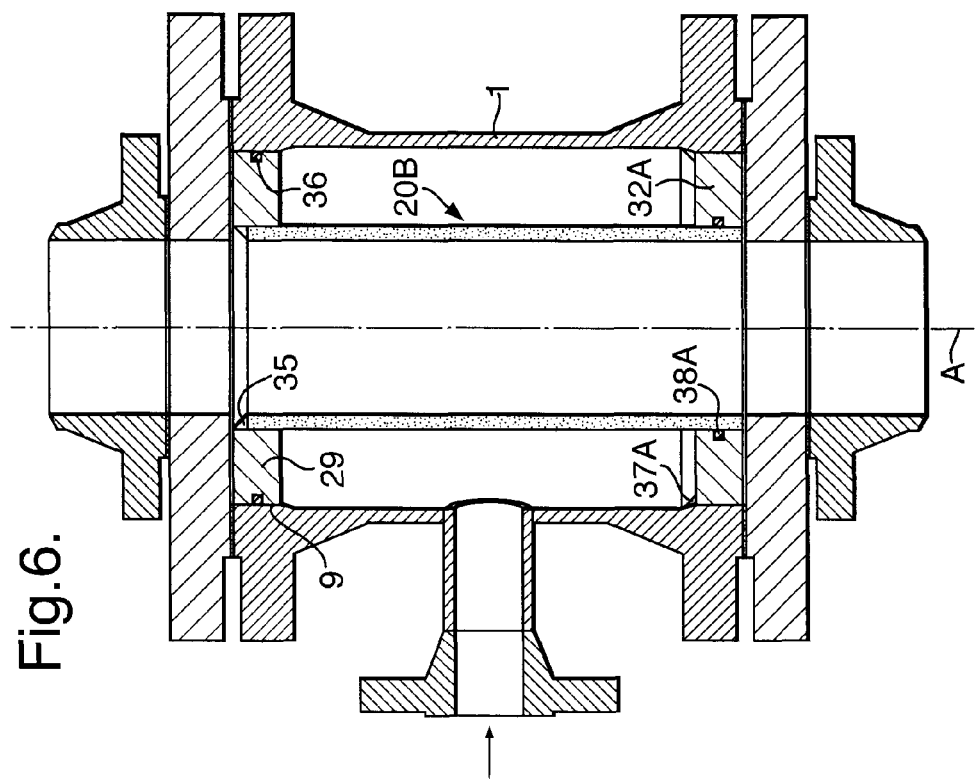
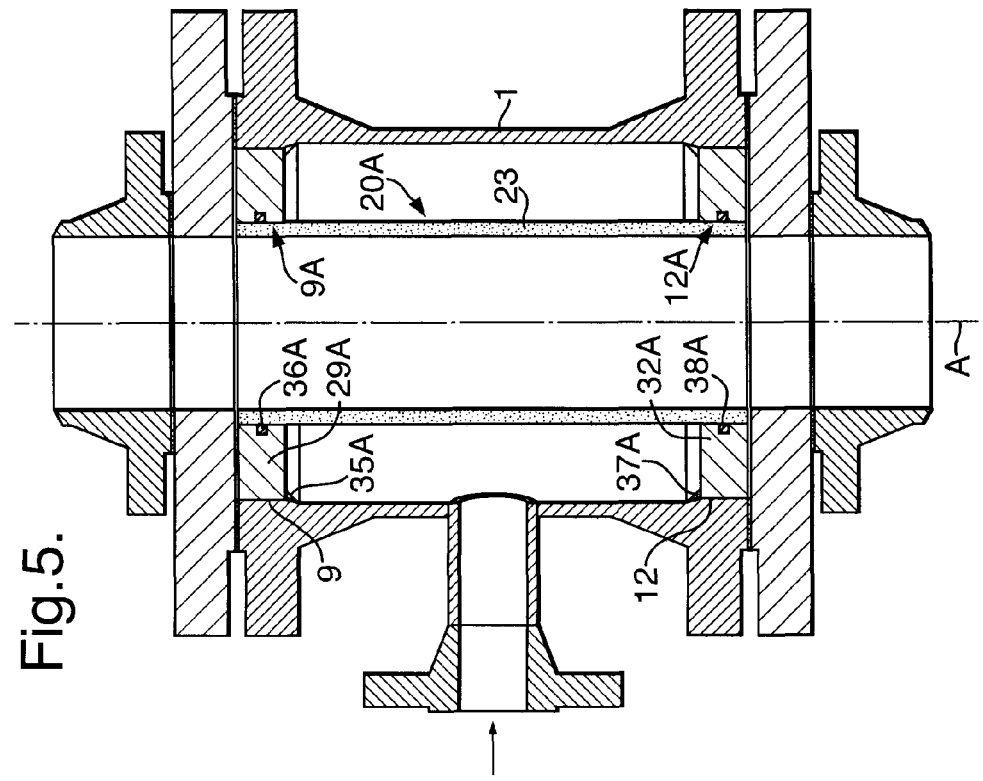

PIPE PART FOR CONVEYING A SOLID PARTICULATE MATERIAL

PRIORITY CLAIM AND CROSS REFERENCE

The present application is a 35 U.S.C. 371 national stage filing of PCT/EP2005/056765 filed 14 Dec. 2005, which claims benefit of European patent application No. 04106660.6 filed 17 Dec. 2004.

FIELD OF THE INVENTION

The present invention relates to a pipe part for conveying a solid particulate material.

BACKGROUND OF THE INVENTION

Examples of a pipe part suitable for conveying a solid particulate material at low to moderate pressure (i.e. up to about 15 bar) are described in U.S. Pat. No. 6,227,768, DE 12 69 571 and WO 2004/087331.

The pipe part disclosed in U.S. Pat. No. 6,227,768 includes an inner conduit adapted for transporting particulate material from the first end to the second end of the conduit and having a gas permeable wall, which inner conduit is longitudinally disposed in an outer conduit having an impermeable wall. The outer conduit in first and second ends is provided with inwardly protruding sealing support rings wherein the inner conduit is rigidly fixed in the outer conduit so that a gas distribution chamber is situated between the outer conduit and the inner conduit and the inwardly protruding sealing support rings. A compressed gas inlet nozzle traverses the outer conduit and a gas pressure source is attached to the gas inlet nozzle conveying gas to the gas distribution chamber and through the gas permeable wall.

A pipe part as disclosed in U.S. Pat. No. 6,227,768 can be used in a pipe system for transporting loads of solid particulates such as powders at relatively moderate temperatures and pressures. Such a pipe systems can for instance be provided downstream of a storage silo or a hopper for particulate materials.

In operation, the external gas pressure traverses the gas permeable inner conduit to assist the transport of the resident or entrained particulate materials.

When the pipe part as disclosed in U.S. Pat. No. 6,227,768, is connected with other pipes sufficiently tight to contain elevated pressures and or temperatures, it is anticipated that the inner conduit will damage under mechanical loads resulting from the connections.

Depending on the materials used, axial loading resulting from differences in thermal expansion between the inner and outer conduits might lead to damage of the inner conduit.

The above is even more pertinent in case the pipe part is to be used in a pipe system for transporting pulverised coal and fly ash in coal gasification plants. Coal gasification is known in the art and involves the partial combustion of solid particulate carbonaceous materials such as coal, petroleum coke and biomass. The partial combustion process is generally carried out at elevated pressures that may be as high as 80 or even 100 bar and at elevated temperatures. Therefore, the pipe system must be suitable for exposure to elevated temperature and/or pressure.

Moreover, replacement of the inner conduit of the known pipe part is cumbersome.

Furthermore, inspection of the inner conduit of the known pipe part is only possible from one side.

It is an object of the present invention to minimize one or more of the above drawbacks.

It is a further object of the present invention to provide an alternative pipe part that can be exposed to elevated temperatures and/or pressures.

SUMMARY OF THE INVENTION

The present invention provides a pipe part for conveying a solid particulate material at high pressure, the pipe part at least comprising:

an outer tubular element stretching along a longitudinal axis and having a first section and a second section being axially displaced from each other;

an inner tubular element disposed inside the outer tubular element and adapted for conveying the solid particulate material from one end to another end and comprising an aeration-fluid-permeable wall part;

wherein the inner tubular element is sealingly connected with the first and second sections to form an aeration fluid distribution chamber between the first and second sections and the inner and outer tubular elements, which aeration fluid distribution chamber is provided with an aeration fluid inlet to define an aeration fluid flow path between the aeration fluid inlet through the aeration-fluid-permeable wall part via the aeration fluid distribution chamber; and wherein the inner tubular element is flexibly supported by both of the first and second sections.

In a further aspect the present invention provides a piping system for conveying a solid particulate material, the pipe system comprising at least one pipe part according to the present invention.

In an even further aspect the present invention provides the use of the pipe part according to the present invention for transporting a solid particulate material in a gasification system.

In another aspect the present invention provides a system for the gasification of a solid particulate material, the system at least comprising:

a source of a solid particulate material;

a gasification reactor in which the solid particulate material can be partially oxidized;

a piping system for feeding the solid particulate material from the source to and into the gasification reactor;

wherein the piping system comprises at least one pipe part according to the present invention.

BRIEF DESCRIPTION OF THE DRAWINGS

The invention will be described hereinafter in more detail and by way of example, with reference to the accompanying non-limiting drawings in which:

FIG. 1 schematically shows a cross sectional view of an outer tubular element for a pipe part in a first embodiment;

FIG. 2 schematically shows a cross sectional view of an inner tubular element to cooperate with the outer tubular element of FIG. 1;

FIG. 3 schematically shows a cross sectional view of the pipe part wherein the outer and inner tubular elements of FIGS. 1 and 2 have been assembled together;

FIG. 4 schematically shows a cross sectional view of the pipe part of FIG. 3 provided with end flanges;

FIG. 5 schematically shows a cross sectional view of an assembled pipe part in a second embodiment;

FIG. 6 schematically shows a cross sectional view of an assembled pipe part in a third embodiment.

Figure 7:
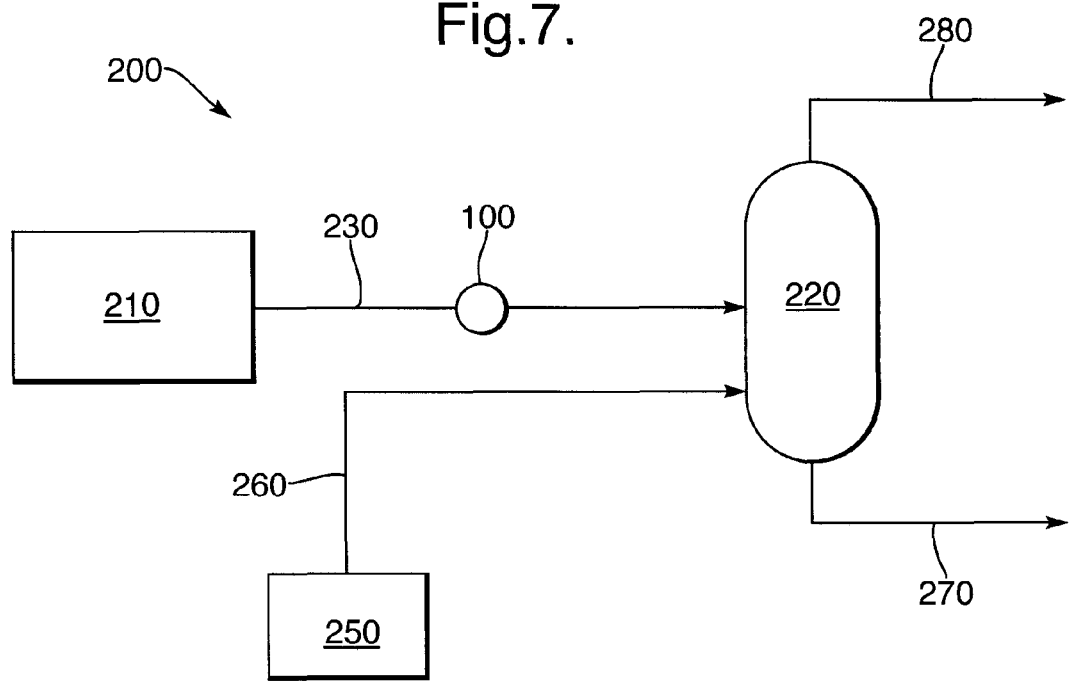
FIG. 7 schematically shows the use of the pipe part of FIG. 3 in a coal gasification system.

In the Figures same reference signs relate to like components.

DETAILED DESCRIPTION OF THE INVENTION

Described below is a pipe part for conveying a solid particulate material at high pressure, the pipe part at least comprising:
an outer tubular element stretching along a longitudinal axis and having a first section and a second section being axially displaced from each other;
an inner tubular element disposed inside the outer tubular element and adapted for conveying the solid particulate material from one end to another end and comprising an aeration-fluid-permeable wall part;
wherein the inner tubular element is sealingly connected with the first and second sections to form an aeration fluid distribution chamber between the first and second sections and the inner and outer tubular elements, which aeration fluid distribution chamber is provided with an aeration fluid inlet to define an aeration fluid flow path between the aeration fluid inlet through the aeration-fluid-permeable wall part via the aeration fluid distribution chamber; and
wherein the inner tubular element is flexibly supported by both of the first and second sections.

An important advantage of this pipe part is that mechanical loading of the inner tubular element via the outer tubular element is reduced. If connections with other pipes are made via the outer tubular element, then the inner tubular element will be less loaded by forces resulting from such connections than would be the case with a rigidly supported inner tubular element.

A further advantage of the present pipe part is that it can be suitably used for transporting solid particulate materials at high temperatures and pressures as high as 80 or even 100 bar.

In a particular preferred embodiment, the inner tubular element is axially slidingly engaged with both of the first and second sections.

Herewith the axial loading of the inner tubular element is strongly reduced as some axial play is still possible for the inner tubular element.

Another advantage of this particular embodiment of the invention is that the inner tubular element can be easily replaced or taken out for inspection by sliding it out of the outer tubular element.

Referring to FIG. 1 there is schematically shown an outer tubular pipe element 1 stretching along a longitudinal axis A. On its first and second ends the outer pipe element 1 has been provided with outwardly protruding first connecting flanges 3 and 6. For the purpose of the drawing, the outer tubular pipe element 1 has been represented by a unitary piece but in practice it is common practice to weld-connect the flanges to a straight pipe piece.

In the vicinity of the first and second ends, first and second sections 9,12 are formed each having have a cylindrical inner wall. These first and second sections 9,12 are axially displaced from each other, and an aeration fluid inlet 15 is traversing the wall of the outer tubular element 1 between the first and second ends. The inlet 15 is connected to a flange 17 for the purpose of fluidly connecting to a source of pressurized aeration fluid.

FIG. 2 shows an inner tubular element 20 that can be disposed inside the outer tubular element 1. The inner tubular element 20 is adapted for conveying solid particulate material through an inner channel 10, along the longitudinal axis A from one end to another end. The inner tubular element 20 comprises an aeration-fluid-permeable wall part 23, which is permeable to the pressurized aeration fluid but impermeable for the solid particulate material to be conveyed.

In this embodiment, the permeable wall part 23 is fully formed out of a permeable material. It is also possible to form the inner tubular element 20 out of a perforated wall which wall itself is impermeable whereby the perforations form the permeable wall part.

Examples of permeable materials include porous resin, sintered metal, sintered metal oxide, sintered glass. In the embodiment of FIG. 2 a sintered metal is employed in the form of a sintered stainless steel, pre-fabricated by GKN Sinter Metals GmbH, Dahlienstrasse 43, D-42477 Radevormwald, Germany.

The diameter of the pores should be large enough to let the gas pass, but small enough to prevent solid particulates to enter the aeration fluid distribution chamber or to clog the pores. Depending on the size distribution of the solid particular material to be conveyed, suitable pore diameters can lie between 1 and 50 µm, or preferably between 1 and 20 µm. For transport of powdered coal and fly ash pore diameters between 7 to 14 µm, preferably having an average pore size of 10 µm has given satisfactory aeration results. The latter has been made from pre-fabricated stainless steel sinter metal type SIKA-R 5 AX from GKN Sinter Metals GmbH mentioned above.

In the vicinity of the inner tubular element ends, the inner tubular element 20 is provided with sealing rings 29, 32 fixed to the permeable wall part 23 via joints 35 and 37. The joints 35, 37 can be welded joints. In their outer peripheral walls, the sealing rings 29, 32 each are provided with a circumferential groove wherein a sealing O-ring 36, 38 is positioned.

The inner tubular element 20 of FIG. 2 is adapted to cooperate with the outer tubular element 1 of FIG. 1 to form a pipe aerator 100. Referring now to FIG. 3, there is shown the pipe aerator 100 in assembled condition, whereby inner tubular element 20 has been slided in longitudinal direction relative to and into the outer tubular element 1. The sealing O-rings 36, 38 sealingly engage with the first and second sections 9 and 12 of the outer tubular element 1 and thereby form a flexible support for the inner tubular element 20 by the first and second sections 9 and 12.

An aeration fluid distribution chamber 40 is formed by the annular space the inner and outer tubular elements 20,1 and between the first and second sections 9, 12. An aeration fluid flow path 19 is defined between the aeration fluid inlet 15 through the aeration-fluid-permeable wall part 23 via the aeration fluid distribution chamber 40.

Transmission of mechanical loads from the outer tubular element 1 to the generally more fragile inner tubular element 20 is not so dominant due to the flexible supporting. Axial loads exercised on the outer tubular element 1 are particularly not transmitted to the inner tubular element 20 due to mutual longitudinally sliding engagement.

The pressure containing tubular elements can be made of standard piping parts that need not be specifically adapted. This is an advantage in view of pressure vessel regulations.

Moreover, the inner tubular element 20 can be slided in and out of the outer tubular element 1 for inspection and/or servicing and/or replacement.

In operation, a solid particulate material such as powdered coal or fly ash, is transported through the inner channel 10. At the same time, pressurized aeration fluid such as preferably nitrogen or another inert gas is fed into the aeration fluid chamber 40 via aeration fluid inlet 15. The aeration fluid distributes itself in the distribution chamber 40 and traverses the permeable wall part 23 towards channel 10 to assist the transport of the resident or entrained solid particulates.

FIG. 4 schematically shows a cross sectional view of the pipe aerator of FIG. 3 provided with second connecting flanges 43, 46 that can be screw bolted to the outwardly protruding first connecting flanges 3 and 6, respectively, with gaskets 41,42 in between. The second connecting flanges 43 and 46 are provided with an internal perforation being aligned with the channel 10 and preferably having the same cross sectional contour and size.

A small axial space 45, 48 is maintained between the second connecting flange 43,46 and the sealing rings 29, 32 in order to at least allow compression of the gaskets 41,42 when bolting up the first and second connecting flanges. Some more space for axial play of the inner tubular element 20 relative to the outer tubular element 1 is provided to avoid straining the inner tubular element 20 when extremely thin gaskets are used. An optional flexible spacer ring may be provided between the joints 35 and 37 and the second connecting flanges 43 and 46 respectively, in order to avoid the solid particulates to intrude into the spaces 45 and 48.

Pipes may be directly welded to the second connecting flanges 43 and 46, but in the embodiment as shown in FIG. 4 so-called welding neck flanges 44,47 have been screw bolted to the second connecting flanges 43,46. Such welding neck flanges are conventionally welded to pipes (in the same way as the first connecting flanges 3,6 are welded to the pipe 1) to provide a gradual transition between the relatively thin wall of the pipe to the thick flange. Alternatively, the welding neck flanges 44,47 can be welded to the second connecting flanges 43,46.

A second embodiment of the fully assembled pipe aerator is schematically depicted in FIG. 5. In this embodiment, sealing rings 29A,32A have been fixedly joined by means of joints 35A,37A in the first and second sections 9,12 of the outer tubular element 1. The outer wall part of inner tubular element 20A has cylindrical outer wall parts 9A and 12A. The sealing rings 29A, 32A each are provided with a circumferential groove in an inwardly facing surface wherein a sealing O-ring 36A, 38A is positioned. In the assembled condition, the sealing O-rings engage with the cylindrical outer wall parts 9A and 12A of the inner tubular element 20A.

An advantage of the second embodiment is that the inner tubular element 20, which is the replaceable part, is cheaper than in the first embodiment because the sealing rings do not form part of it.

A third embodiment of the fully assembled pipe aerator 100 is schematically depicted in FIG. 6. This embodiment is a combination of the first and second embodiments, wherein one end of the pipe aerator 100 is provided with sealing ring 29 and O-ring 36 slidingly engaging with the cylindrical inner wall 9 of the first section in the outer tubular element 1 and the other end of the pipe aerator is provided with sealing ring 32A and O-ring 38A slidingly engaging with the cylindrical outer wall part 12A of the inner tubular element 20B.

In this embodiment the inner tubular element 20B can only be placed in the outer tubular element 1 in one orientation. This can in particular be advantageous in case that the micro pores in the aeration fluid permeable wall part have an angular orientation relative to the longitudinal direction so that the aeration fluid that traverses the inner tubular element wall is given a longitudinal velocity component that can assist the transport of the solid particulates. Herewith the throughput rate can be increased relative to a random orientation of the micro pores.

FIG. 7 shows schematically the use of the pipe part 100 in a coal gasification system for assisting in the transport of particulate coal to be gasified. The system 200 comprises at least a source 210 of particulate coal to be gasified, a gasification reactor 220 in which the particulate coal is to be partially oxidized, a piping system 230 for feeding the coal from the source 210 to and into the gasification reactor 220.

The piping system 230 comprises at least one pipe part 100 between the source 210 and the gasification reactor 220.

Further, an oxygen source 250 for feeding an oxygen containing stream via line 260 to the gasification reactor 220 is shown.

After partial combustion of the particulate coal in the gasification reactor 220 thereby producing synthesis gas, slag is removed via line 270 and the synthesis gas is removed via line 280 to undergo further processing, if desired.

As gasification systems as such are known, they are not further discussed here.

The person skilled in the art will readily understand that the invention can be modified in many ways without departing the scope of the appending claims.

What is claimed is:

1. A pipe part for conveying a solid particulate material at high pressure, the pipe part at least comprising:
    an outer tubular element stretching along a longitudinal axis (A) and having a first section and a second section being axially displaced from each other;
    an inner tubular element disposed inside the outer tubular element and adapted for conveying the solid particulate material from one end to another end wherein the entire inner tubular element is permeable to pressurized aeration fluid and impermeable to the solid particulate material;
    wherein the inner tubular element is sealingly connected with the first and second sections by a flexible support to form an aeration fluid distribution chamber between the first and second sections and the inner and outer tubular elements, which aeration fluid distribution chamber is provided with an aeration fluid inlet to define an aeration fluid flow path between the aeration fluid inlet through the inner tubular element via the aeration fluid distribution chamber; and
    wherein the flexible support comprises a first sealing ring fixed to the inner tubular element and to the first section of the outer tubular element by a first sealing O-ring and a second sealing ring fixed to the inner tubular element and to the second section of the outer tubular element by a second sealing O-ring.

2. The pipe part according to claim 1, wherein the inner tubular element is axially slidingly arranged relative to the outer tubular element.

3. The pipe part according to claim 2, wherein at least one of the first and second sections have a cylindrical inner wall, and wherein the inner tubular element is provided with at least one sealing means cooperating with the cylindrical inner wall.

4. The pipe part according to claim 2, wherein the inner tubular element has a cylindrical outer wall part, and wherein at least one of the first and second sections is provided with at least one sealing means cooperating with the cylindrical outer wall.

5. The pipe part according to claim 1, wherein the inner tubular element comprises pores having a pore diameter in the range from 0.1 to 200 μm.

6. The pipe part according to claim 1, wherein the pipe part is adapted for conveying a solid particulate material having a pressure of >20 bar.

7. The pipe part according to claim 1, wherein the inner tubular element comprises pores having a pore diameter in the range from 1 to 100 μm.

8. The pipe part according to claim 1, wherein the inner tubular element comprises pores having a pore diameter in the range from 1 to 50 μm.

9. The pipe part according to claim 1, wherein the inner tubular element comprises pores having a pore diameter in the range from 1 to 20 μm.

10. The pipe part according to claim 1, wherein the inner tubular element comprises pores having a pore diameter in the range from 7 to 14 μm.

11. The pipe part according to claim 1, wherein the pipe part is adapted for conveying a solid particulate material having a pressure of >50 bar.

12. A piping system for conveying a solid particulate material at high pressure comprising at least one pipe part comprising:
- an outer tubular element stretching along a longitudinal axis (A) and having a first section and a second section being axially displaced from each other;
- an inner tubular element disposed inside the outer tubular element and adapted for conveying the solid particulate material from one end to another end wherein the entire inner tubular element is permeable to pressurized aeration fluid and impermeable to the solid particulate material;
- wherein the inner tubular element is sealingly connected with the first and second sections by a flexible support to form an aeration fluid distribution chamber between the first and second sections and the inner and outer tubular elements, which aeration fluid distribution chamber is provided with an aeration fluid inlet to define an aeration fluid flow path between the aeration fluid inlet through the inner tubular element via the aeration fluid distribution chamber; and
- wherein the flexible support comprises a first sealing ring fixed to the inner tubular element and to the first section of the outer tubular element by a first sealing O-ring and a second sealing ring fixed to the inner tubular element and to the second section of the outer tubular element by a second sealing O-ring.

13. A system for the gasification of a solid particulate material, the system at least comprising:
- a source of a solid particulate material;
- a gasification reactor in which the solid particulate material can be partially oxidized; and
- a piping system for feeding the solid particulate material from the source to and into the gasification reactor;
- wherein the piping system comprises at least one pipe part comprising:
- an outer tubular element stretching along a longitudinal axis (A) and having a first section and a second section being axially displaced from each other;
- an inner tubular element disposed inside the outer tubular element and adapted for conveying the solid particulate material from one end to another end wherein the entire inner tubular element is permeable to pressurized aeration fluid and impermeable to the solid particulate material;
- wherein the inner tubular element is sealingly connected with the first and second sections by a flexible support to form an aeration fluid distribution chamber between the first and second sections and the inner and outer tubular elements, which aeration fluid distribution chamber is provided with an aeration fluid inlet to define an aeration fluid flow path between the aeration fluid inlet through the inner tubular element via the aeration fluid distribution chamber; and
- wherein the flexible support comprises a first sealing ring fixed to the inner tubular element and to the first section of the outer tubular element by a first sealing O-ring and a second sealing ring fixed to the inner tubular element and to the second section of the outer tubular element by a second sealing O-ring inner tubular element is flexibly supported by both of the first and second sections.

14. A method of transporting a solid particulate material which comprises providing a piping system for conveying a solid particulate material at high pressure, assisting the transport of the solid particulate material by introducing an aeration fluid into the moving solid particulate material through a pipe part which comprises:
- an outer tubular element stretching along a longitudinal axis (A) and having a first section and a second section being axially displaced from each other;
- an inner tubular element disposed inside the outer tubular element and adapted for conveying the solid particulate material from one end to another end wherein the entire inner tubular element is permeable to pressurized aeration fluid and impermeable to the solid particulate material;
- wherein the inner tubular element is sealingly connected with the first and second sections by a flexible support to form an aeration fluid distribution chamber between the first and second sections and the inner and outer tubular elements, which aeration fluid distribution chamber is provided with an aeration fluid inlet to define an aeration fluid flow path between the aeration fluid inlet through the inner tubular element via the aeration fluid distribution chamber; and
- wherein the flexible support comprises a first sealing ring fixed to the inner tubular element and to the first section of the outer tubular element by a first sealing O-ring and a second sealing ring fixed to the inner tubular element and to the second section of the outer tubular element by a second sealing O-ring.

15. The method of claim 14, wherein the solid particulate material is comprised of coal and the pipe part is used to assist in the transport of solid particulate coal in a system for the gasification of the solid particulate coal.

\* \* \* \* \*